Figure 1:
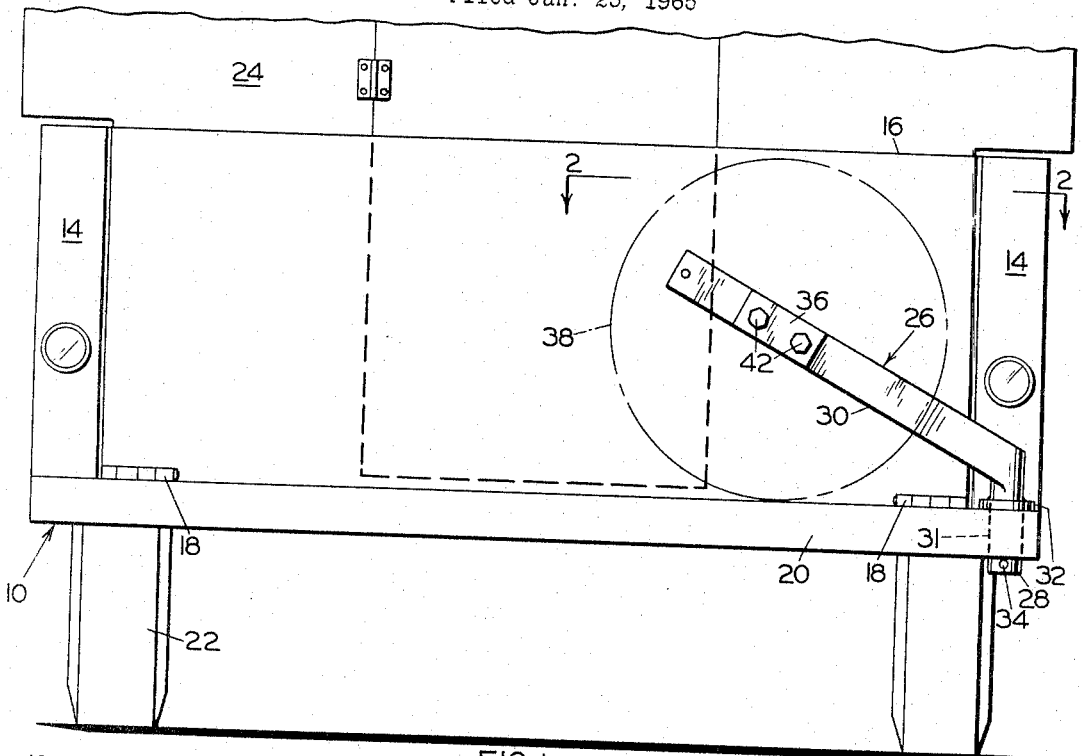

June 20, 1967   J. CHEADLE   3,326,434
SPARE WHEEL HOLDER FOR VEHICLES
Filed Jan. 25, 1965

INVENTOR.
JOSEPH CHEADLE
BY Eugene M. Echelman
ATTORNEY

United States Patent Office 3,326,434
Patented June 20, 1967

3,326,434
SPARE WHEEL HOLDER FOR VEHICLES
Joseph Cheadle, Wetherly Bldg., Portland, Oreg. 97214
Filed Jan. 25, 1965, Ser. No. 427,818
1 Claim. (Cl. 224—42.21)

This invention relates to new and useful improvements in spare wheel holders for vehicles.

One of the primary purposes of the present invention is to provide means for carrying a spare wheel on a pickup-type truck in a position such that access to the spare wheel is convenient and furthermore in a position such that said spare wheel is out of the way. In the conventional type pickup truck, the spare wheel is generally carried on one side of the vehicle or is suspended under the frame. When the wheel is carried on a side of the vehicle it is in the way for certain operations in connection with the vehicle, such as for the loading and unloading of camper housings thereon. When the spare wheel is carried below the frame, such wheel is difficult to reach and therefore difficult to mount and demount in the event of a flat tire. The present spare wheel holder mounts the wheel in an out of the way position, but yet supports it for easy mounting and mounting.

Therefore, a primary objective of the present invention is to provide a novel spare wheel holder which is adapted to be pivotally mounted on a portion of a vehicle such that said spare wheel can be pivoted to an out of the way position relative to a movable portion of the vehicle.

A more particular object of the present invention is to provide a spare wheel holder particularly applicable for combination with a pickup-type truck utilizing a hinged rear door or tail gate, whereby said spare wheel is pivotal from a position parallel with, and closely adjacent to, the tail gate to an outwardly angled out of the way position.

Another object is to provide a spare wheel holder applicable for use with a pickup-type truck utilizing a hinged tail gate and employing latch means adapted normally to hold the spare wheel holder against the tail gate.

Briefly stated, the present spare wheel holder comprises a wheel holding arm having a vertical portion, arranged to be journaled in a platform of a vehicle, and an angular arm portion extending from the vertical arm portion for releasably holding a wheel. The journaled mounting of the wheel holding arm permits it to move pivotally between a pair of positions one of which disposes a spare wheel in parallel relation with a transverse tail gate of the vehicle and the other of which disposes the spare wheel in a rearward direction permitting opening of the tail gate. Latch means are provided for holding the wheel supporting arm in its position parallel with the tail gate.

The invention will be better understood and additional objects will become apparent from the following specification and claim, considered together with the accompanying drawings, wherein the numerals of reference indicate like parts.

Figure 2:
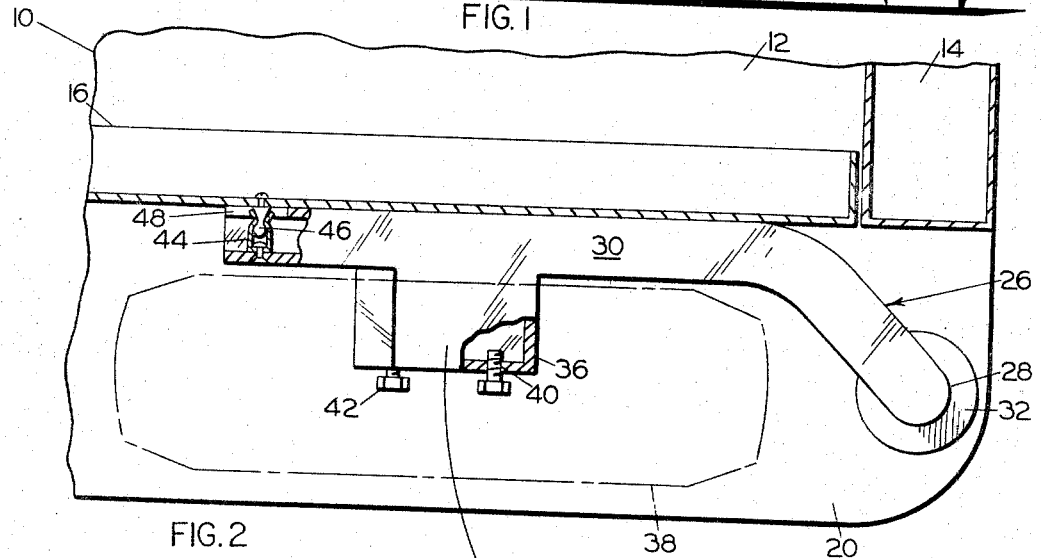

In the drawings:

FIGURE 1 is a fragmentary, rear elevational view of a pickup-type truck and showing a spare wheel holder of the present invention mounted thereon; and FIGURE 2 is an enlarged, fragmentary, sectional view taken on the line 2—2 of FIGURE 1.

Referring in particular to the drawings, the numeral 10 designates generally a vehicle such as a pickup-type truck. Such a vehicle includes a loading box 12 having side walls 14 and a front wall not shown. A tail gate or door 16 is disposed at the rear end of the loading box and is hingedly connected to the vehicle by suitable hinges 18 whereby it may be opened or closed as desired.

Also, in a pickup-type truck as described there is employed a rearwardly projecting platform 20 which extends substantially the full width of the truck. The ends of the platform extend laterally beyond the side edges of the tail gate 16. The vehicle has suitable supporting wheel 22, and may serve various purposes such as for supporting and transporting a camper housing 24.

The present spare wheel holder is adapted for combination particularly with a vehicle of the type described. The holder comprises an arm member 26 having a vertical portion 28 and an upwardly angled portion 30. Vertical arm portion 28 is circular is cross section and is rotatably received in a suitable vertical bore 31 in the platform 20 adjacent one end of the latter. Importantly, the bore 31 in the platform 20 is located outwardly beyond the one end of the tail gate. Arm portion 28 has an integral flange 32 for supporting the arm member 26 on the platform 20. Suitable locking means 34, such as a cotter key mounted in the lower end of the arm portion 28, is utilized for maintaining a rotatable but connected mounting of the arm 26 on the platform.

The angular arm portion 30 has a rearwardly projecting bracket 36 to which a spare wheel 38, shown in phantom lines, may be releasably secured. Such bracket may include a housing, as shown, provided with threaded apertures 40 for receiving the usual wheel lug bolts 42.

Angular arm portion 30 may be of any suitable, structurally rigid construction, as for example a tubular or angular construction. As shown, such arm portion comprises a rectangular tubular construction with the bracket 36 projecting integrally therefrom.

Mounted adjacent the free end of arm member 26 is a first latch element 44 adapted for engagement with a second latch element 46 secured to the tail gate 16. Preferably, latch element 44 is secured to one wall of the angular arm portion 30 and the opposite wall of said arm has a cut-out or opening 48 with which the latch element 44 is aligned. When the two latch elements 44 and 46 are in engagement, the arm 26 is anchored in a fixed position, and furthermore the arm 30 is held against the rear surface of the tail gate.

It is apparent that when the tail gate 16 is closed the arm member 26 may be latched in abutment against the tail gate as shown in FIGURES 1 and 2. However, when it is desired to swing the tail gate down, the arm member 26 is unlatched by pulling rearwardly on the outer end thereof and then swinging said arm member rearwardly in the direction of arrow 50. The arm is pivoted sufficiently to move it out of the path of opening of the tail gate, and then may be returned to its latched position after the tail gate has again been raised.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

In combination, a pickup truck having a rearward transverse platform disposed in a horizontal plane, door means at the rearward end of said truck having hinged movement rearwardly over said platform, said platform having one end projecting laterally to one side of said door, a vertical opening in that portion of said platform which projects laterally beyond to one side of said door, a wheel holding arm having a vertical portion journaled in said opening, said wheel holding arm including a portion thereof extending angularly from said vertical portion into rearward alignment with a portion of said door, means on said angular arm portion for releasably attaching a spare wheel thereto, said arm being rotatable relative to the platform and being capable of being positioned either in parallel relation with said door or in an angular rearwardly extending position out of the path of movement of said door, and latch means on said angular arm portion and said truck for releasably holding the wheel holding arm in said position which is parallel with said door.

References Cited

UNITED STATES PATENTS

| | | | |
|---|---|---|---|
| 964,153 | 7/1910 | Gaynor | 224—42.21 |
| 2,620,105 | 12/1952 | Errickson | 224—42.21 |
| 2,649,308 | 8/1953 | Bice | 296—57 X |
| 2,698,118 | 12/1954 | Dickason | 224—42.21 |

FOREIGN PATENTS 330,350   7/1958   Switzerland.

LEO FRIAGLIA, *Primary Examiner.*

BENJAMIN HERSH, *Examiner.*

M. S. SALES, *Assistant Examiner.*